Patented Jan. 6, 1931

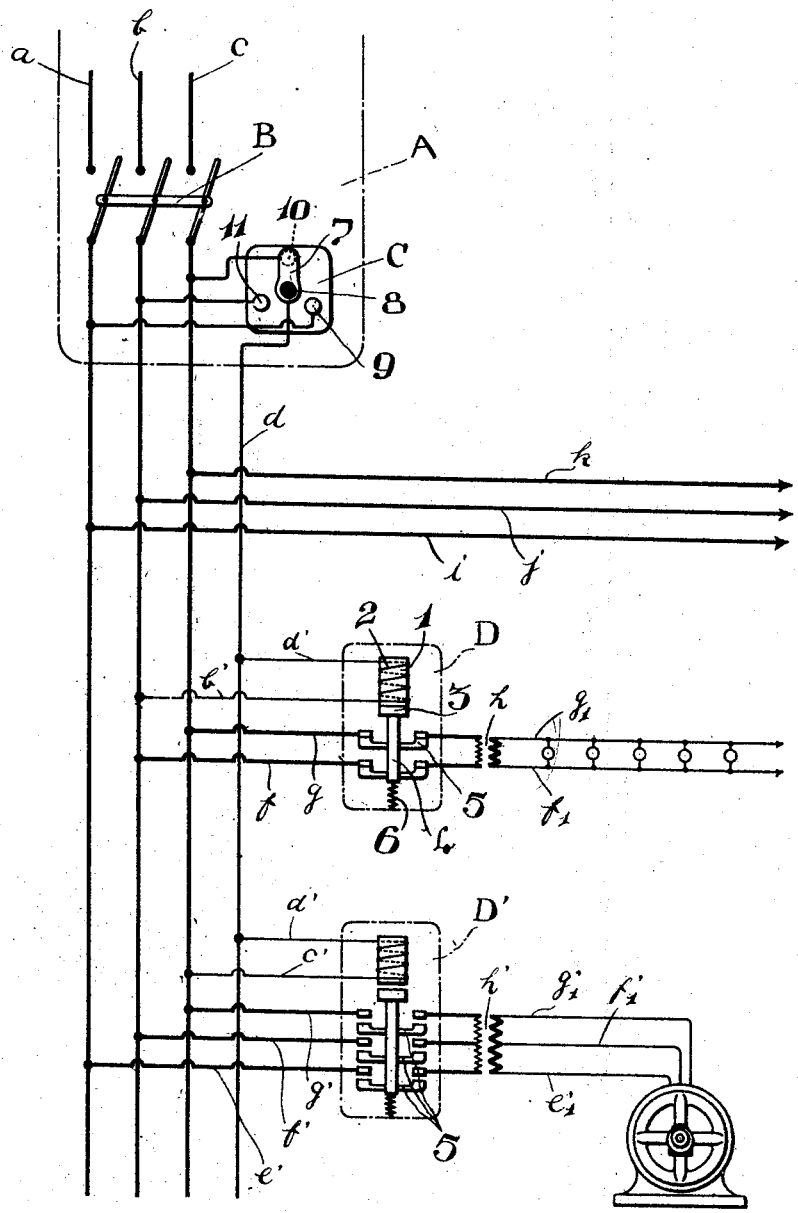

1,787,500

UNITED STATES PATENT OFFICE

NOBUFUMI TOGAMI, OF SAGA, JAPAN

ELECTRIC DISTRIBUTING SYSTEM

Application filed April 5, 1922. Serial No. 549,902.

My invention relates to improvements in electric distributing system and has for its object to provide a simple and economical distributing system capable of controlling the supply of electric power to either one or both sets of branch lines from a distant switching station through one and the same set of transmission lines.

According to the present invention, a switching line is laid alongside the transmission lines or distributing main, and is arranged to be connected to any one of the transmission lines at the switching station. At each branching point of the branch lines or consumer's lines, remote controlled switch is arranged and this switch is provided with an electro-magnet, the coil of which is connected to said switching line and a proper one of the transmission lines. When the switching line is connected to one of the transmission lines at the switching station, the corresponding set or sets of electro-magnets to be energized by said connection is made to operate the respective remote controlled switches, and thereby the corresponding set or sets of branch lines are closed. Thus by changing the connection of the switching line to one or the other of the transmission lines, the electric power can be supplied to either one or both sets of branch lines.

Said connection of the switching line may be controlled by single pole switches respectively, provided on each of the transmission lines, but a multipole switch is preferably used, and by turning its arm the connection of the switching line to any one of the transmission lines can be changed in a desired manner. Each remote controlled switch, provided at the branching points of the branch lines comprises an electro-magnet as mentioned before. One end of the coil of said electro-magnet is connected to the switching line, and the other end is connected to the proper one of the transmission lines so as to differ from each other for each set of branch lines according to the demand for electric supply. At one end of the iron core of the electro-magnet, a movable iron piece or armature, having brushes for closing or opening the circuit of the branch line, is provided.

The distributing system of the present invention is especially suited for three phase electric transmission systems, as electric power can be supplied for two sets of branch lines, separately or at the same time through one and the same set of transmission lines. In ordinary practice it is necessary to lay two sets of transmission lines for such a demand of supply, but according to the present invention it can be attained by adding only a switching line to a single set of the transmission lines, and therefore wire is much economized. The present invention, however, is not limited to three-phase systems but it can be applied also to direct current or single phase transmission. In these cases it is not so good as in the case of three-phase systems because of the fact that electric current can not be supplied for different sets of branch lines at the same time, but according to the present system the situation of the distributing line can be easily discriminated at the switching station by the position of the arm of the multipole switch, and it shows much superiority compared with hitherto known systems in respect that mistakes of distribution can be avoided.

The annexed drawing shows an example of a distributing system according to the present invention applied to three-phase electric transmission. In the drawing $a$, $b$ and $c$ designate a three phase transmission line or distributing main; $d$ the switching line laid alongside the transmission line; $f$, $g$ and $e'$, $f'$ $g'$ two sets of branch lines; $f_1$, $g_1$, and $e'_1$, $f_1'$, $g'_1$, consumers' lines respectively connected to the branch lines $f$, $g$ and $e_1$, $f_1$, $g$, through transformers $h$ and $h'$; $i$, $j$ and $k$ another set of branch lines directly connected to the transmission lines. A shows a switching station; B a main switch on the transmission lines; C a multipole switch provided at the switching station between the switching line $d$ and the transmission lines $a$, $b$, $c$; and D, D' are remote controlled switches provided at the branching points of the branch lines.

Each remote controlled switch is similarly constructed and is properly connected to the transmission lines and switching lines according to the demand for supply of electric power to the respective branch lines. It comprises a fixed laminated iron core 1 and a coil 2 around the core 1 to form an electro-magnet adapted to attract a movable iron piece or armature 3. The armature 3 has a stem 4 made of insulating material, provided with brushes 5 or 5', and at the other end of the stem a spiral spring 6 is provided, so that when the electro-magnet is energized, the brushes 5 or 5' close the circuits of the respective chamber lines. When the electro-magnets are not energized, the branch lines are opened by the action of the springs 6. One end of the magnetic coil 2 of each automatic switch is connected to the switching line $d$ by the wire $d'$, and the other end is connected to the transmission line $b$ by the wire $b'$ in the automatic switch D or similar set, while in the remote controlled switch D' or other similar set the other end of the coil is connected to another transmission line $c$ by the wire $c'$. In short, one end of the magnetic coil in each automatic switch is always connected to the switching line, and the other end is connected to either one of the transmission lines except one, for instance $a$, as shown in the drawing.

The multipole switch $c$ at the switching station comprises a conductive arm 7, revolving on an axis 8 which is electrically connected to the switching line $d$, and three contact points 9, 10 and 11 respectively connected to the transmission lines $a$, $b$ and $c$, are arranged around the axis 8, so that the switching line may be connected to any one of the transmission lines by turning the arm 7.

The operation of the system is as follows: When it is desired to supply electric power to the branch lines $f$, $g$ and the similar lines, the arm 7 of the multipole switch C is moved to engage with the contact point 10, in the switching station $a$. Then the switching line $d$ attaining equal potential with that of the transmission line $c$, a certain potential difference exists between the switching line $d$ and the transmission line $b$, and therefore in the remote controlled switch D, the electro-magnet is energized and attracts the armature 3. The circuit of the branch line $f$ and $g$ is thus closed by the brushes 5, so that electric power is supplied to the said branch line. At this time the switching line $d$ and the transmission line $b$ are at equal potential and the electro-magnet of switch D' remains inoperative, so that the branch lines $e'$, $f'$ and $g'$ are kept open. On the contrary when it is desired to supply electric power to the branch lines $e'$, $g'$, $f'$ and similar lines, the arm 7 of the multipole switch is turned so as to come in contact with the contact point 11 at the switching station. Then the switching line $d$ attains equal potential with transmission line $b$ and a difference of poential relatively to line $c$. Therefore, in the remote controlled switch D' the electro-magnet is energized and attracts the armature 3 and moves the brushes 5'. At the same time in the remote controlled switch D, the armature 3 is brought back to its original position by the spring 6, and the branch lines $f$ and $g$ open. In case it is desired to supply electric power to both sets of the branch lines simultaneously the arm 7 of the multipole switch is brought to the contact point 9. Then the switching line $d$ attaining equal potential to the transmission line $a$ shows potential difference for both of the transmission lines $b$ and $c$, and therefore the electro-magnets in both remote controlled switches D and D' are energized, and electric power is supplied to the branch lines $f$, $g$ and $c'$, $f'$, $g'$ and similar lines at the same time.

According to the present invention, as above stated, electric power can be supplied by one and the same set of transmission lines to either set or both sets of the branch lines by shifting the multipole switch provided at the distant switching station.

I claim:—

1. In an electrical distributing system, a plurality of polyphase feed conductors, a switching station, a selective remote control switch provided at said station and having terminals individually connected to the said feed conductors, a common operative member of said selective switch, a switching conductor with electro-magnets provided along the said feed conductors and connected to the common operative member, and branch circuit control switches, said electromagnets being connected to the said switching conductor and to one of the said feed conductors respectively, while the other of the said feed conductors is unconnected to any of the electromagnets.

2. In an electrical distributing system, a set of three phase feed conductors, a switching station, a selective remote control switch provided at said station and having terminals connected to the said feed conductors respectively, a common operative member for said selective switch, a switching conductor with electromagnets provided along the said feed conductors and connected to the common operative member, and branch circuit control switches, said electromagnets being connected to the said switching conductor and to one of the said feed conductors respectively, one of the said feed conductors being left unconnected to any of the said electromagnets.

In testimony whereof I have affixed my signature.

NOBUFUMI TOGAMI.